Jan. 6, 1931. H. THOMAS 1,788,213
TUBE STILL FOR OIL DISTILLATION AND CRACKING
Filed June 14, 1927 2 Sheets-Sheet 1

INVENTOR
Henry Thomas
BY
Busser and Harding
ATTORNEYS.

WITNESS:
Robt R Kitchel

Jan. 6, 1931.   H. THOMAS   1,788,213
TUBE STILL FOR OIL DISTILLATION AND CRACKING
Filed June 14, 1927   2 Sheets-Sheet 2

INVENTOR
Henry Thomas
BY
ATTORNEYS.

WITNESS:

Patented Jan. 6, 1931

1,788,213

UNITED STATES PATENT OFFICE

HENRY THOMAS, OF RIDLEY PARK, PENNSYLVANIA, ASSIGNOR TO SUN OIL COMPANY, OF PHILADELPHIA, PENNSYLVANIA, A CORPORATION OF NEW JERSEY

TUBE STILL FOR OIL DISTILLATION AND CRACKING

Application filed June 14, 1927. Serial No. 198,703.

The object of my invention is to provide a tube still adapted for the distillation of oils and suitable for cracking at a high temperature or for partial vaporization at a lower temperature.

The object of the invention is to provide a still in which the combustion is completed before the hot gases reach the intermediate neighborhood of the tube banks; in which an ample volume of recirculated gases, cooled by heat exchange with the oil, is mixed with the gases of combustion; in which such admixture is thoroughly effected in an ample and unobstructed space below the tube banks; in which means are provided to withdraw a proportion of such relatively cool gases against the pull of the power driven fans tending to recirculate such gases; and in which such withdrawn gases, still carrying considerable heat, are brought into heat exchange relation with fresh air, whereby the latter is preheated before admission to the combustion chamber, thereby enabling the combustion to be rapidly completed.

A preferred embodiment of the invention is shown in the accompanying drawings, in which—

A series of Dutch ovens or firing and combustion chambers $a$, $a$, $a$ communicate with a common chamber $b$ the lower part of which acts as a combining or mixing chamber, above which are arranged two tube banks $c$ and $d$. Baffles $e$ compel all the gases that have passed through the lower tube bank $c$ to pass through the upper tube bank $d$.

Pipes $f$, $f$, $f$ lead from the roof of the tube-containing chamber to a stack $g$, the lower end of which connects with a duct $h$ extending along the rear of the furnace. Duct $h$ communicates, beyond one end of the furnace, with a forwardly extending duct $i$ communicating with the main stack $k$, there being a damper $j$ in duct $i$ controlling the amount of waste gases going to the stack.

Communicating with duct $h$ are ducts $m$, $m$, $m$, extending forwardly underneath the furnace and communicating through reticulated brick walls $n$, with the bottoms of the respective Dutch ovens $a$, $a$, $a$, at the rear ends thereof communicating with the combining space of chamber $b$. Power driven circulating fans $o$, located near the junctions of duct $h$ and ducts $m$, $m$, $m$, take hot gases from duct $h$ and drive them through ducts $m$ into the mixing space of the furnace. Dampers $p$ may be located adjacent the fans $o$.

Figure 1:
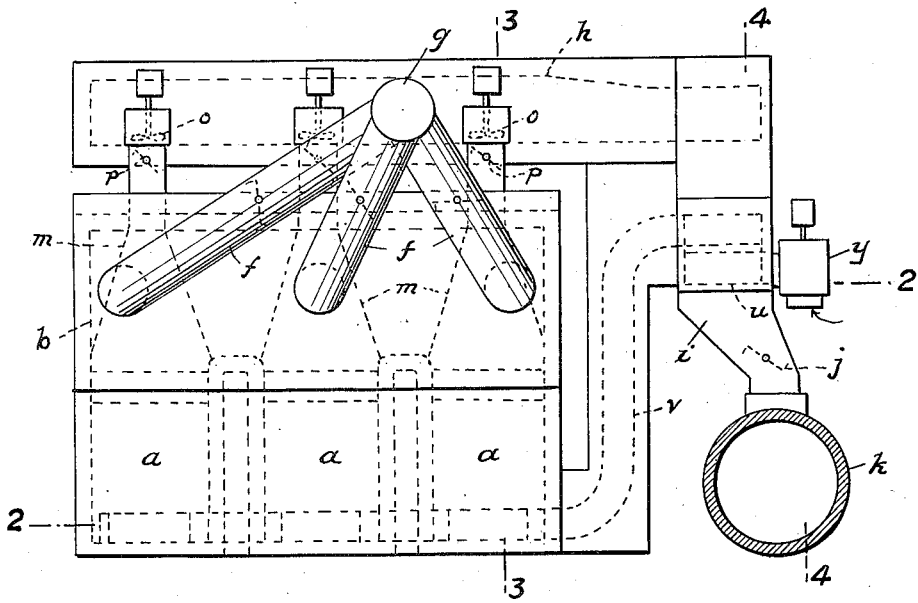
Fig. 1 is a plan view of the complete apparatus.
Figure 2:
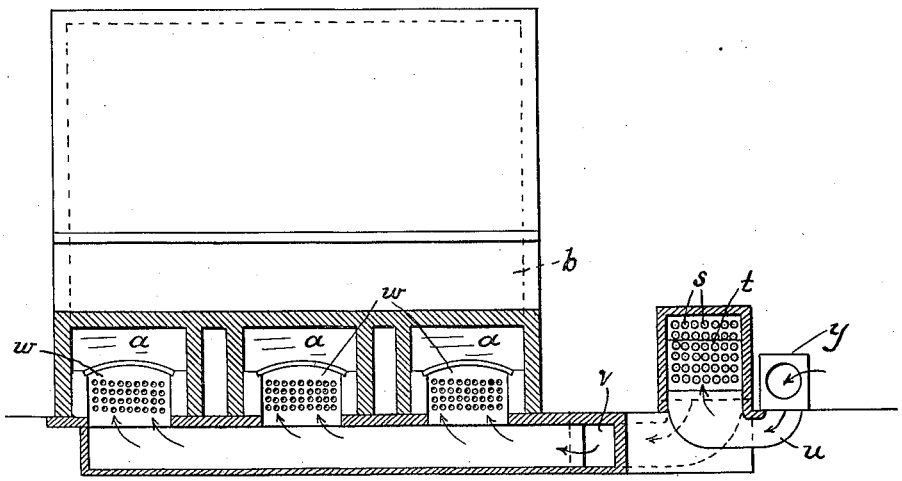
Fig. 2 is a longitudinal section on the lines 2—2 of Fig. 1.
Figure 3:
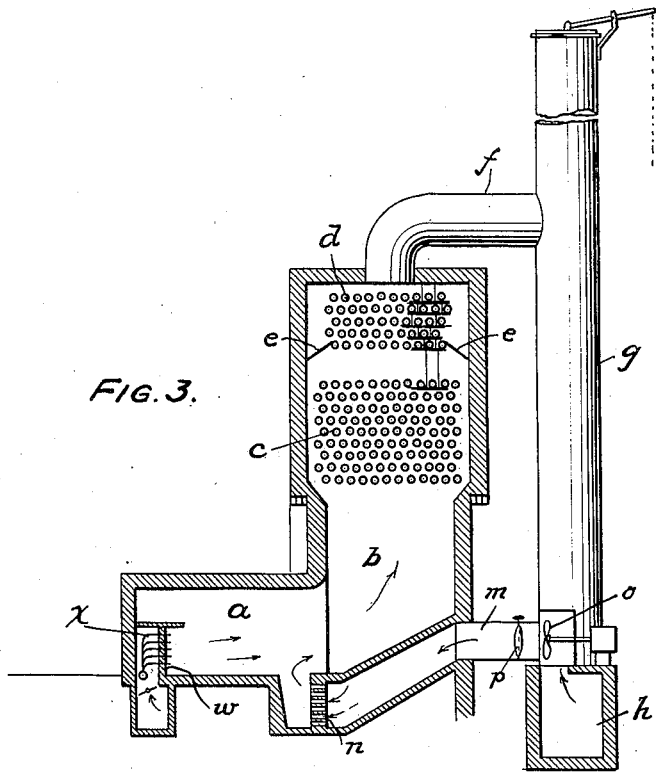
Fig. 3 is a transverse section on the line 3—3 of Fig. 1.
Figure 4:
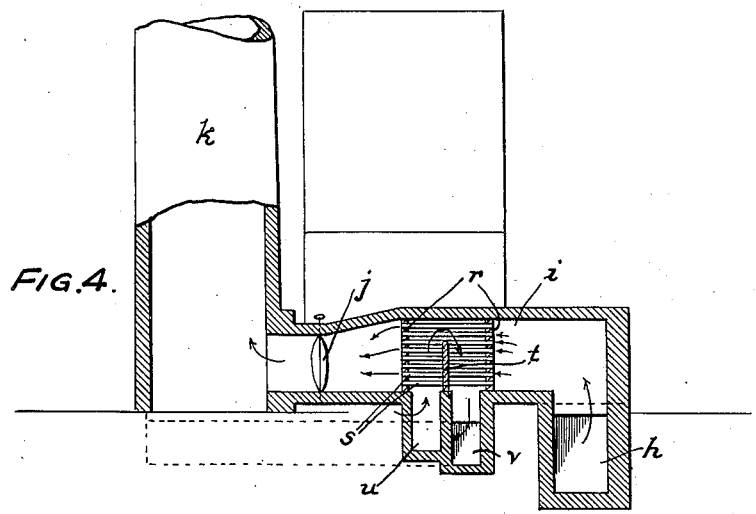
Fig. 4 is a transverse section on the line 4—4 of Fig. 1.

Partitions $r$, forming between them a heat exchange chamber, extend across duct $i$. A baffle $t$ extends across this chamber midway between partitions $r$. Tubes extend through this chamber between the partitions. The gases pass through these tubes on their way through duct $i$ from duct $h$ to stack $k$. A fresh air duct $u$ communicates at one end with the atmosphere and at the other end with the heat exchange chamber on one side of baffle $t$. A fan $y$ forces air into this duct. An air duct $v$ communicates at one end with the heat exchange chamber on the other side of baffle $t$ and at the other end with air inlet boxes at the front ends of the Dutch ovens. Through perforations in the walls $w$ the air enters the ovens. Any suitable burners may be positioned adjacent this air inlet. Fig. 3 shows gas oil inlet tubes $x$ extending through the perforations in wall $w$.

In operation, fresh air enters duct $u$ and in the course of its flow over tubes $s$ is in heat-exchange with the relatively hot gases flowing through tubes $s$ toward the main stack $k$. Due to this preheating of the air, combustion in the Dutch ovens is very much improved and occurs more rapidly, and no flames carry further than the inner or rear ends of the Dutch ovens. Complete combustion, therefore, occurs in chambers $a$. The high temperature gases, as they leave chambers $a$, are reduced in temperature by dilution with the relatively cool recirculating gases flowing from ducts $m$ into the rear ends of chambers $a$. The cooling action of these recirculated gases gives a comparatively mild, even temperature under the tube bank and an atmosphere which is substantially free of, or at least comparatively low in, uncombined oxygen and is of relatively mild and uniform temperature.

The gases, after passing up through the tube bank, through which the oil to be distilled or cracked is flowing, flows out stack connections $f$ into stack $g$ and thence, through duct $h$, is distributed to the several recirculating ducts $m$ and the duct $i$ leading to the main stack. The amount of waste gases going to the main stack, which will be approximately equal to and in proportion to the amount of fresh air going to the burners, is controlled by the damper $j$. The main stack is of such height that it provides a sufficient draft to pull the required amount of waste gases against the pull of the recirculating fans $o$. The heat of these waste gases is, as above explained, largely transferred to the fresh air passing through conduits $u$ and $v$ to the burners.

While three Dutch ovens are shown, any number may be provided.

The tube banks should be supported between their ends from the furnace roof so as to allow the chamber $b$ to be of any desired length and so as to afford the least possible obstruction to the flow of the gases upwardly toward and around the tubes. The tubes are preferably suspended as shown in an application for patent filed by me July 6, 1927, Serial No. 203,702; but as the mode of supporting the tubes is no part of the present invention, the suspending means are not herein shown. In order to secure the maximum advantage, or even any appreciable advantage, from recirculating gases, the volume of gases so circulated should be comparatively large. To so circulate a large volume of gases, the power consumption required for driving the fans is excessive unless the path of the gases is of comparatively low resistance. In order to reduce this resistance, the area through the tubes $c$, $d$, pipes $f$, stack $g$ and ducts $h$ and $m$ must not be too much restricted and the path of flow from and back to the chamber $b$ must be as direct as possible. High resistance to flow of the gases involves excessive power consumption. It is objectionable for another reason. With high resistance to flow of gases, it is necessary that the differential pressure created by the fans shall be very great, and as a result either the positive pressure in the furnace becomes excessive, or the negative pressure on the suction sides of the fan becomes excessive, or both conditions exist at the same time. Such conditions, particularly the high positive pressure in the furnace, are detrimental to the furnace.

In the described structure embodying my invention, the volume of gases circulated is large, and the path of flow of the recirculating gases is direct and of comparatively small resistance and has a minimum pressure drop.

In a tube still which is heated to a fairly high temperature, and particularly in a tube still used for cracking, it is important that the rate of heat transfer should be comparatively low and as uniform as possible throughout the entire heating surface in order to avoid local overheating with resultant formation of carbon. My invention is especially adapted to accomplish this result. The combustion takes place with great rapidity due to the preheating of the incoming air, and combustion is completed in the Dutch ovens. The excessive temperature of the gases of combustion is reduced by dilution with the necessary large volume of recirculated gases that have been largely deprived of their heat. Consequently, a mild, even temperature is produced under the tube bank and an atmosphere which shows complete combustion and uniform temperature.

If the tubes are suspended from above, the furnace can be made of any desired length. Owing to the absence of arches or walls for distributing the heat from the burners, for preventing the flame from contacting with the tubes, and for carrying, or assisting in carrying, the tubes, the width of the tube bank can be as great as is desired. It is not essential that the number of ducts $f$ leading from the tubes shall correspond to the number of Dutch ovens, nor is it necessary that these ducts should be connected to the gas-return ducts $m$ through the medium of ducts $g$ and $h$, inasmuch as it is practicable to connect ducts $f$ directly with ducts $m$.

Having now fully described my invention, what I claim and desire to protect by Letters Patent is:

1. A tube still comprising an upright gas-combining and heating chamber, a bank of tubes in the upper part thereof adapted to convey oil, a series of laterally disposed Dutch ovens communicating with the lower part of the chamber below said tubes, air inlets at the forward ends of the Dutch ovens, means including channels and power-driven fans to recirculate cooled gases from the region of the tubes to the region adjacent the junction of the floor of the Dutch ovens and the lower front part of the upright chamber, a branch channel from said gas-conveying channels, a stack communicating with said branch channel adapted to provide draft sufficient to pull a proportion of said cooled gases against the pull of the power-driven fans, and a fresh air conduit in heat exchange relation with one of said channels and communicating with the air inlet of the Dutch oven, there being an unobstructed space in said upright chamber below the tubes and above the rear of the Dutch oven for dilution of gases of combustion from the Dutch ovens with recirculated gases to produce a mild and even temperature under and around the bank of tubes.

2. A tube still comprising an upright chamber, a bank of tubes in the upper part thereof and spaced from the lower part thereof a substantial distance and thereby providing a substantially open unobstructed space, of a depth approximating the width of a bank of tubes, for the admixture of gases of combustion with relatively cool recirculated gases, a laterally disposed Dutch oven communicating with the lower part of said chamber, means including channels and power-driven means to recirculate a part of the cooled gases from the upper part of said chamber above said tubes to the region adjacent the junction of the floor of the Dutch oven with the lower front part of said upright chamber, a stack, a duct communicating with said stack adapted to discharge thereinto another part of said cooled gases, and a fresh air conduit in heat exchange relation with said duct and communicating with the forward end of the Dutch oven.

3. A tube still comprising an upright chamber, a bank of tubes in the upper part thereof, a series of laterally disposed Dutch ovens communicating with the lower part of the chamber, a series of pipes for removal of cooled gases from the upper part of the chamber, a stack communicating with said pipes, a conduit communicating with said stack, ducts extending from said conduit and communicating with the rear ends of the several Dutch ovens, power-driven fans adapted to force cooled gases from said conduit through said ducts, a main stack, a duct connecting said conduit with the main stack, and a fresh air conduit in heat exchange relation with the last named duct and communicating with the forward ends of the Dutch ovens.

4. A tube still comprising a series of Dutch ovens having inlets for fuel and air at the front ends thereof, there being inlets for supplying relatively cool gases at the region of the rear of the Dutch ovens, means providing a substantially unobstructed space rearwardly beyond and above said cool gas inlets for admixture of gases of combustion and said relatively cool gases, a bank of tubes extending horizontally substantially at right angles to the direction of extension of the Dutch ovens and of a length exceeding the combined widths of the Dutch ovens, the space around said tube bank being above and in substantially unobstructed communication with said gas-mixing space, means providing an outlet for cooled gases from the tube bank space, means to split the current of cooled gases and to convey a proportion thereof to said cooled gas inlets, and means to supply to the inlets at the front ends of the Dutch ovens air in volume equal to the proportion of cooled gases that is not conveyed to said cooled gas inlets.

5. A tube still comprising an upright gas-combining and heating chamber, a bank of tubes in the upper part thereof adapted to convey oil, there being in said chamber below said tubes a gas combining and mixing space of substantial height, a series of laterally disposed Dutch ovens communicating with the lower part of the chamber below said space, air inlets at the forward ends of the Dutch ovens, means including recirculating cool gas channels extending from the region of the tubes to the region adjacent the junction of the rear of the Dutch ovens and the lower part of the upright chamber, said channels including ducts extending under the upright gas-combining and heating chamber, there being one of said ducts for each Dutch oven, each duct at its forward end approximating in width that of the corresponding Dutch oven.

6. A tube still comprising an upright gas-combining and heating chamber, a bank of tubes in the upper part thereof adapted to convey oil, a series of laterally disposed Dutch ovens communicating with the lower part of the chamber below said tubes, air inlets at the forward ends of the Dutch ovens, means including recirculating cool gas channels extending from the region of the tubes, said channels including ducts extending along and under the bottom of the upright gas-combining and heating chamber and opening from beneath the Dutch oven into the rear thereof at a point approximately in line with the front wall of the gas-combining and heating chamber.

In testimony of which invention, I have hereunto set my hand, at Marcus Hook, Pennsylvania, on this 3rd day of June, 1927.

HENRY THOMAS.